United States Patent [19]
Grehn et al.

[11] Patent Number: 5,199,801
[45] Date of Patent: Apr. 6, 1993

[54] TWO ROW ANGULAR-CONTACT ROLLER BEARING

[75] Inventors: Martin Grehn, Dittelbrunn; Norbert Kretzer, Donnersdorf, both of Fed. Rep. of Germany

[73] Assignee: FAG Kugelfischer Georg Schäfer KGaA, Fed. Rep. of Germany

[21] Appl. No.: 786,270

[22] Filed: Nov. 1, 1991

[30] Foreign Application Priority Data
Nov. 23, 1990 [DE] Fed. Rep. of Germany ....... 4037270

[51] Int. Cl.$^5$ ............................................. F16C 33/38
[52] U.S. Cl. ................................... 384/506; 384/510; 384/512; 384/526
[58] Field of Search ............... 384/506, 510, 526, 531, 384/539, 512

[56] References Cited
U.S. PATENT DOCUMENTS

| | | | |
|---|---|---|---|
| 4,626,113 | 12/1986 | Forknall et al. | 384/526 |
| 4,783,182 | 11/1988 | Caron et al. | 384/512 |
| 4,844,628 | 7/1989 | Knappe | 384/510 |
| 5,096,310 | 3/1992 | Meining et al. | 384/506 |

Primary Examiner—Lenard A. Footland
Attorney, Agent, or Firm—Ostrolenk, Faber, Gerb & Soffen

[57] ABSTRACT

A two row angular-contact roller bearing having on undivided bearing ring and one axially divided bearing ring with a respective row of rolling elements rolling over each of the axial sections of the divided ring. The respective comb separator for each of the rows of rolling elements has an annular collar that projects axially toward the annular collar on the other separator. One separator annular collar is radially inclined inwardly and the other separator collar is radially inclined outwardly. The collars are so placed as to interfere, and they are sufficiently flexible as to deform and upon the collars being pushed together for causing the collars to loosely interlock sufficiently to enable one row of rolling elements and their separator to rotate with respect to the other. Elevations defined on the divided race ring sections support the axially inward sides of the rows of rolling elements. A shoulder on the divided race ring section engages the axially outward side of the row of rolling elements. In one embodiment, a radially inwardly inclined, axially inwardly projecting tapering retaining collar on one of the separators extends into a cooperating radial groove in its associated divided ring section for defining the axially inward support side for the respective row of rolling elements.

17 Claims, 2 Drawing Sheets

Fig.: 1
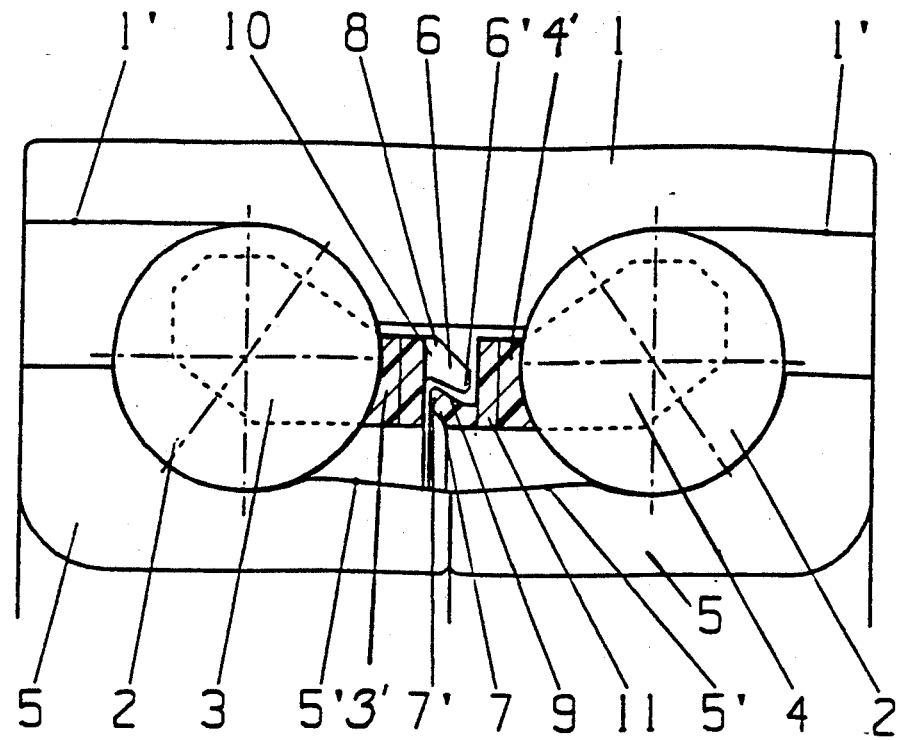
Fig.: 2
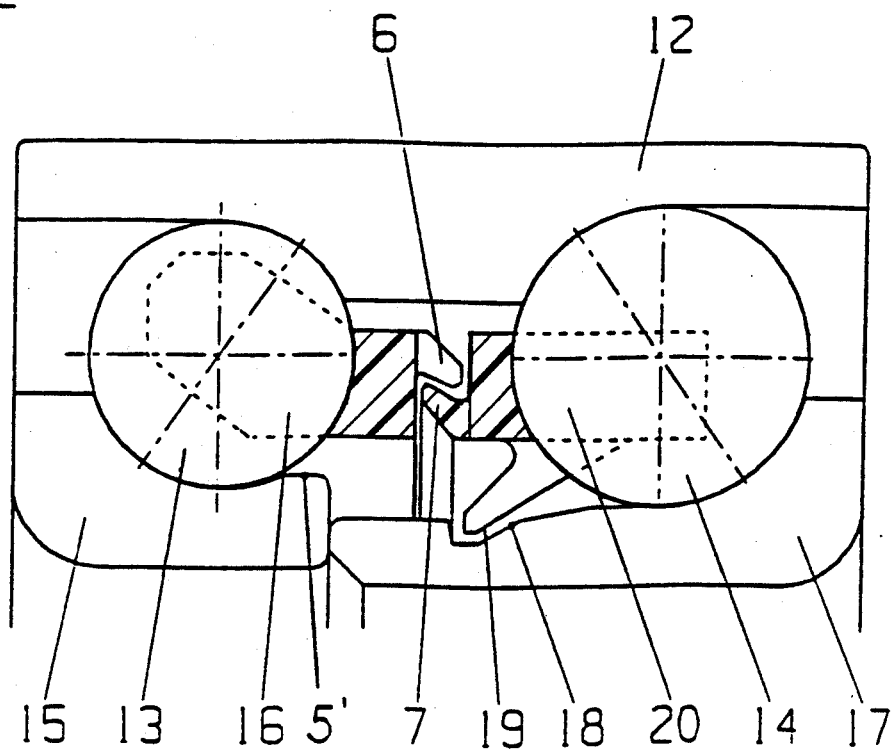

Fig.: 3
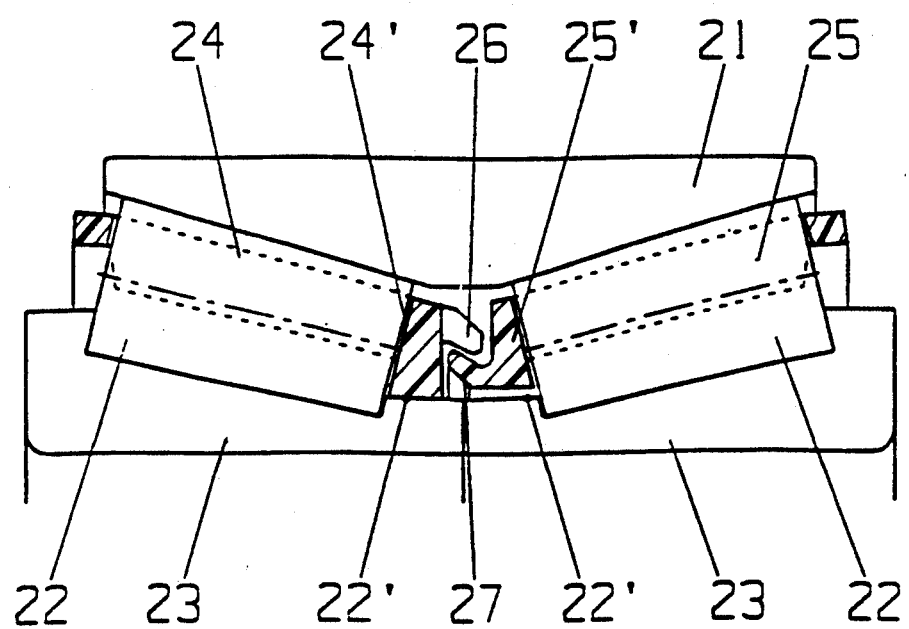

TWO ROW ANGULAR-CONTACT ROLLER BEARING

BACKGROUND OF THE INVENTION

The invention concerns a two row angular-contact roller bearing, particularly a ball bearing or a tapering-cylinder bearing, wherein at least one race ring is axially divided and wherein each row of rolling elements has a separator or cage that interlocks axially with the adjacent separator in the vicinity of the axially divided ring.

Two row angular-contact roller bearings with at least one race ring that is axially divided are often highly desirable because they are easy to assemble and install. Since their two separators are usually of one-piece together, the axially divided race rings combine with the rest of the bearing to constitute a single assembly. Such a design, however, often has the drawback that the two rows of balls or rollers are not free to rotate independently of each other. This has resulted in development of bearing embodiments like those disclosed in German Published Application 2 449 194 or French Published Application 2 308 013. The two rows of rollers in these embodiments can rotate independently. But eliminating the ring destroys the integrity of the assembly unless the shoulder, which is no longer needed on the outer ring to transmit the load, is retained. Another bearing embodiment is disclosed in German Petty Patent DE-GM 1 655 634. Its connector, however, is complicated and the additional component is difficult to install.

SUMMARY OF THE INVENTION

The object of the invention is accordingly to improve a bearing of the aforesaid type to avoid the described drawbacks, while retaining the advantage of independent motion by the two rows of rolling elements or rollers in an integrated bearing of any size.

In a bearing according to the invention, at least one ring, e.g. the inner race ring is axially divided into two sections. A tapering, axially projecting, radially inclined, annular, resilient collar; on the ring part of one separator for one rolling elements loosely interlocks with a matching tapering, oppositely axially projecting, oppositely radially inclined, annular, resilient collar on the ring part of the other separator, which loosely holds the separators together while permitting each to rotate independently. A respective shoulder is formed on each section of the divided race ring, e.g. on the axially outward edge, to retain the rolling element in the bearing. Elevations formed on the axially divided race ring axially interlock with the rolling elements the axial side of each race ring section that lacks a rolling element retaining shoulder. This is a simple way to interlock the bearing components and it can be easily achieved when the components are made of plastic in a process that involves axial mold slides. The elevations that interlock with the rolling elements make it possible to preassemble all the components into a single unit. Assembly is further facilitated because the other one piece race ring lacks a shoulder or bead on either outwardly facing side so that that ring can easily be provided with an assembly comprising two comb separators, two rolling elements sets, and the axially divided inner race rings. This assembly is combined into a single unit by the elevation on the divided race ring, and it is necessary only to snap the collars on the separators together to complete the assembly.

The annular collars on both of the separators in one embodiment can have notches at spaced intervals around the collar. These notches make the collars more flexible.

Additional notches can extend axially further behind at least some of the first mentioned notches in the collars. The additional notches provide a practical additional recess for lubricant.

The surfaces of the collars that face each other in the disassembled state can have tapering sections that would engage each other and normally interfere with the collars locking together. The collars freely yield elastically to permit their being snapped to lock together.

Another embodiment features an additional tapering, axially projecting and radially inclined retaining collar on one of the separators. That additional collar extends into a groove in its associated divided ring section. This cooperating retaining collar and groove replaces the elevation on that divided ring section and performs the same function of combining the assembly into a single unit.

Other objects and features of the invention will become apparent from the following description of the invention which refers to the accompanying drawings.

BRIEF DESCRIPTION OF THE DRAWINGS

Exemplary embodiments of the invention are now described with reference to the drawings, wherein FIG. 1 is a longitudinal section through part of a two row angular-contact roller bearing, FIG. 2 is a similar section through a version of a bearing with asymmetrically divided race rings, and FIG. 3 is a similar section through a third embodiment with tapering cylindrical rollers.

DETAILED DESCRIPTION OF THE INVENTION

The two row angular-contact roller bearing of FIG. 1 comprises a one-piece outer ring 1, two annular parallel rows or series of rolling elements, here bearing element balls 2, supported and spaced apart in respective separators or cages 3 or 4, and two divided, axially adjacent inner ring sections 5, with a respective section for each row of balls. Since the one piece outer ring 1, which is radially spaced from the inner rings, has no shoulders toward its axial end faces, the remaining components of the bearing can easily be inserted into the outer ring axially from both sides. These components are in two almost identical groups. The axially inside region of each inner ring section 5 has a slight radial elevation 5' axially inward from the end of the ring section that locks the balls 2 in place. Components 2, 3, and 5 on one axial side and 2, 4 and 5 on the other axial side, each constitute a unit that can be preassembled before installation in the outer ring 1. To ensure that each unit will remain a single unit after they have been assembled, the axially inward ring part 3' on one comb separator 3 has a tapering, resilient material, radially inwardly inclined, axially inwardly projecting, annular collar 6 that interlocks with a matching, essentially complementary, resilient material, radially outwardly inclined, also axially inwardly projecting, annular collar 7 on the axially inward ring part of the other comb separator 4. The collars 6 and 7 are so shaped and placed as to normally interfere with each other as the separators are moved axially together. But the collars are sufficiently flexible to deform as they engage and then the collars move past each other and snap into their interlocked condition. Since the interlock is a loose one and is axial, the two separators can rotate independently, which is often desirable. Since the collars 6 and 7 are flexible and also have respective cooperating tapering surfaces 6' and 7' at their leading edges, they are easy to snap together. The cooperating surfaces contact each other and the collars deform to permit them to pass each other and then snap together to interlock.

Collars 6 and 7 are even more elastic because their axially inner circumferences are notched by respective notches 8 circumferentially spaced around collar 6 and notches 9 circumferentially spaced around collar 7. As shown in FIG. 1, the notches 8 and 9 are also circumferentially offset with respect to each other.

Leading axially outward of at least-some of the notches 8 and 9 are respective additional notches 10 and The additional notches retain lubricant in this difficult to reach vicinity of the bearing.

FIG. 2 illustrates a roller bearing embodiment that is similar to that illustrated in FIG. 1. Facing the one piece outer ring 12 in this embodiment are two annular rows of bearing balls 13 and 14. Balls 13 are smaller than balls 14. The inner ring section 15 and the separator 16 are identical with the inner ring section 5 and the collar 6 in the version illustrated in FIG. 1. But, in the vicinity of the larger diameter balls 14 there is a different inner ring section 17, which has a smaller outer diameter. Inner ring section 17 has a radially inwardly directed groove 18, into which a tapering or radially and axially inwardly inclined retaining collar 19 extends. Since the collar 19 extends out of the separator 20, the ring 17 forms a single unit with the separator 20.

As shown in FIG. 3, the invention can also be employed in a two row tapering cylinder bearing. In this embodiment, a one piece outer ring 21 faces two axially neighboring, annular rows of axially inwardly tapering cylinder rollers 22 that race over two respective inner ring sections 23. Two separate window separators or cages 24 and 25 have cooperating inclined, tapering interlocking collars 26 and 27 which function like the collars 6 and 7 described above. The components that fulfill the function of elevations 5' in this embodiment are the radially short height edgings 22'.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A two row angular contact rolling element bearing, having an outer ring, an inner ring radially inward of and spaced from the outer ring, two axially separated rows of bearing rolling elements between the outer and inner rings and a respective rolling element separator for the rolling elements of each row;

at least one of the rings of the bearing is axially divided into two axial sections, a respective one of the rows of rolling elements rolls over each section of the divided ring;

each of the separators for a respective row of rolling elements includes a respective resilient material collar which projects axially in the direction toward the other separator, the collars on the separators interlocking to each other as the separators are moved together to position the respective rows of rolling elements in the rings, the separator collars interlocking loosely to permit each separator and the respective rolling element row to rotate independently of the other separator and its respective rolling element row;

each divided ring section having means thereon located axially inward of the respective row of rolling elements for being engaged by and for positioning the row of rolling elements in the separator and the ring section.

2. The bearing of claim 1, wherein each of the divided ring sections includes a shoulder axially outward of the respective row of rolling elements for holding the row of rollers from moving axially outward and also including the means axially inward of the row of rolling elements for holding the row of rolling elements at the axially inward side of the rolling elements.

3. The bearing of claim 2, wherein the means on the divided bearing ring section for holding the rolling elements comprise radially outwardly projecting elevations on the divided race ring sections.

4. The bearing of claim 2, wherein the other bearing ring is undivided;

the undivided ring having shoulders which are axially inward of the respective rows of rolling elements, whereby the rolling element rows are held in the bearing by the generally opposed axially inward shoulders on the undivided ring and the axially outward shoulders on the divided rings.

5. The bearing of claim 4, wherein it is the inner ring of the bearing that is axially divided and the outer ring that is undivided.

6. The bearing of claim 1, wherein each of the collars has respective circumferentially spaced apart notches defined in it for enhancing the flexibility of the collars.

7. The bearing of claim 6, further comprising additional notches extending axially from the first mentioned notches and away from the respective other collar, and the additional notches being adapted for holding bearing lubricant.

8. The bearing of claim 1, further comprising notches in the collars adapted for receiving and holding bearing lubricant.

9. The bearing of claim 1, wherein the collars project axially toward each other and the collars are so shaped as to normally interfere with each other as the separators nd the respective rows of rolling elements are moved axially toward each other into position in the bearing rings; the collars being sufficiently flexible to deform as they contact each other as the collars are moved together and the collars being so shaped that after they initially deform, the collars then loosely interlock enabling each of the separators and the respective rolling element rows to independently rotate.

10. The bearing of claim 9, wherein the collars have respective tapering sections which are adapted to engage and are taperingly shaped to aid the collars in deforming and sliding past each other as the collars and the separators are moved together toward the interlocked condition.

11. The bearing of claim 1, wherein each of the collars projects axially toward the other collar, one collar projects at an incline radially outwardly, while the other collar projects at an incline radially inwardly so that the collars interlock.

12. The bearing of claim 1, wherein the other bearing ring is undivided.

13. The bearing of claim 1, wherein the means on one of the ring sections for being engaged by the row of rolling elements comprises a second retaining collar on the respective separator for the one ring section and a groove in the respective divided ring section for the one separator, the second collar on the one separator extending into the groove of the ring section thereof.

14. The bearing of claim 13, wherein the second collar is inclined to axially project toward the other separator and to radially incline toward the respective divided ring section.

15. The bearing of claim 1, wherein the rolling elements are bearing balls, so that the bearing is a two row angular contact ball bearing.

16. The bearing of claim 1, wherein the rolling elements are tapering cylinders with a gradually diminishing diameter axially inwardly and toward the other row of rolling elements.

17. The bearing of claim 16, wherein each section of the divided bearing ring has a respective shoulder axially inward of the respective tapering cylinders for holding the respective rows of cylinders in their axial position.

* * * * *